United States Patent
Sohma et al.

(10) Patent No.: US 7,983,528 B2
(45) Date of Patent: Jul. 19, 2011

(54) MOVING IMAGE MANAGEMENT METHOD AND APPARATUS

(75) Inventors: Hidetomo Sohma, Kanagawa (JP); Hiroshi Tojo, Tokyo (JP); Masanori Itoh, Okasa (JP); Masafumi Shimotashiro, Osaka (JP); Tadashi Nakamura, Nara (JP)

(73) Assignees: Canon Kabushiki Kaisha, Tokyo (JP); Panasonic Corporation, Osaka (JP)

( * ) Notice: Subject to any disclaimer, the term of this patent is extended or adjusted under 35 U.S.C. 154(b) by 1365 days.

(21) Appl. No.: 10/930,852

(22) Filed: Sep. 1, 2004

(65) Prior Publication Data
US 2005/0027745 A1 Feb. 3, 2005

Related U.S. Application Data

(63) Continuation of application No. PCT/JP03/02557, filed on Mar. 5, 2003.

(30) Foreign Application Priority Data

Mar. 5, 2002 (JP) ................................. 2002-058798

(51) Int. Cl.
*H04N 5/93* (2006.01)

(52) U.S. Cl. ....................... 386/278; 386/280

(58) Field of Classification Search .............. 386/52–64, 386/1, 45–46, 94–96, 125–126
See application file for complete search history.

(56) References Cited

U.S. PATENT DOCUMENTS

| | | | | |
|---|---|---|---|---|
| 6,434,103 | B1 * | 8/2002 | Shitara et al. | 369/83 |
| 6,463,536 | B2 * | 10/2002 | Saito | 713/176 |
| 6,701,331 | B1 | 3/2004 | Sawada et al. | 707/203 |
| 2002/0040360 | A1 | 4/2002 | Sohma et al. | 707/3 |
| 2002/0114615 | A1 | 8/2002 | Tojo et al. | 386/68 |
| 2003/0016291 | A1 | 1/2003 | Tojo | 348/222.1 |

(Continued)

FOREIGN PATENT DOCUMENTS

EP 1 055 994 A2 11/2000

(Continued)

OTHER PUBLICATIONS

European Communication and Supplementary Search Report dated Feb. 8, 2008, regarding Application No. 03743609.4-2223.

*Primary Examiner* — Thai Tran
*Assistant Examiner* — Nigar Chowdhury
(74) *Attorney, Agent, or Firm* — Fitzpatrick, Cella, Harper & Scinto

(57) ABSTRACT

For multiple moving-image recorded on a storage medium, one piece of meta-data or each of multiple pieces of meta-data recorded for a part or all of the moving-image is managed by meta-data indices. A meta-data index keeps invalidity information indicating whether a piece of meta-data is going to be invalid and validity information indicating validity of the current piece of meta-data in the same form, when operations such as editing and processing are performed on a part or all of a moving-image that is an object of a piece of meta-data. When cutting-out occurs on a section of a moving-image that is an object of a piece of meta-data and the piece of meta-data cannot be recalculated, the invalidity information is copied to the validity information. In this manner, a meta-data added to the moving-image can be adapted and be used after the moving-image is edited.

5 Claims, 10 Drawing Sheets

| | ALL-VALID | PARTLY-VALID | ALL-INVALID |
|---|---|---|---|
| VALUE OF VALIDITY INFORMATION | 00 | 01 | 10 |
| VALUE OF INVALIDITY INFORMATION | 00 | 01 | 10 |

U.S. PATENT DOCUMENTS

| | | |
|---|---|---|
| 2003/0052910 A1 | 3/2003 | Shiiyama ............... 345/719 |
| 2003/0058354 A1* | 3/2003 | Parulski et al. ........ 348/231.6 |
| 2003/0086021 A1 | 5/2003 | Tojo ...................... 348/700 |
| 2003/0142954 A1 | 7/2003 | Kotani et al. ............ 386/52 |
| 2004/0218838 A1 | 11/2004 | Tojo et al. ............... 382/305 |

FOREIGN PATENT DOCUMENTS

| | | | |
|---|---|---|---|
| EP | 1 083 567 A2 | | 3/2001 |
| EP | 1 102 493 A1 | | 5/2001 |
| EP | 1 333 440 A2 | | 8/2003 |
| JP | 8-77116 | | 3/1996 |
| JP | 9-306147 | | 11/1997 |
| JP | 10 174043 | * | 6/1998 |
| JP | 11-312081 | | 11/1999 |
| JP | 2000-339207 | | 12/2000 |
| JP | 2001-292421 | | 10/2001 |
| JP | 2003-92723 | | 3/2003 |
| JP | 2003-230086 | | 8/2003 |

* cited by examiner

FIG. 6

| | ALL-VALID | PARTLY-VALID | ALL-INVALID |
|---|---|---|---|
| VALUE OF VALIDITY INFORMATION | 00 | 01 | 10 |
| VALUE OF INVALIDITY INFORMATION | 00 | 01 | 10 |

FIG. 7

| CUTTING-OUT TYPE | ALL-REMAINING | FORWARD-PART-REMAINING | BACK-PART-REMAINING | CENTER-REMAINING |
|---|---|---|---|---|
| | 11 | 10 | 01 | 00 |

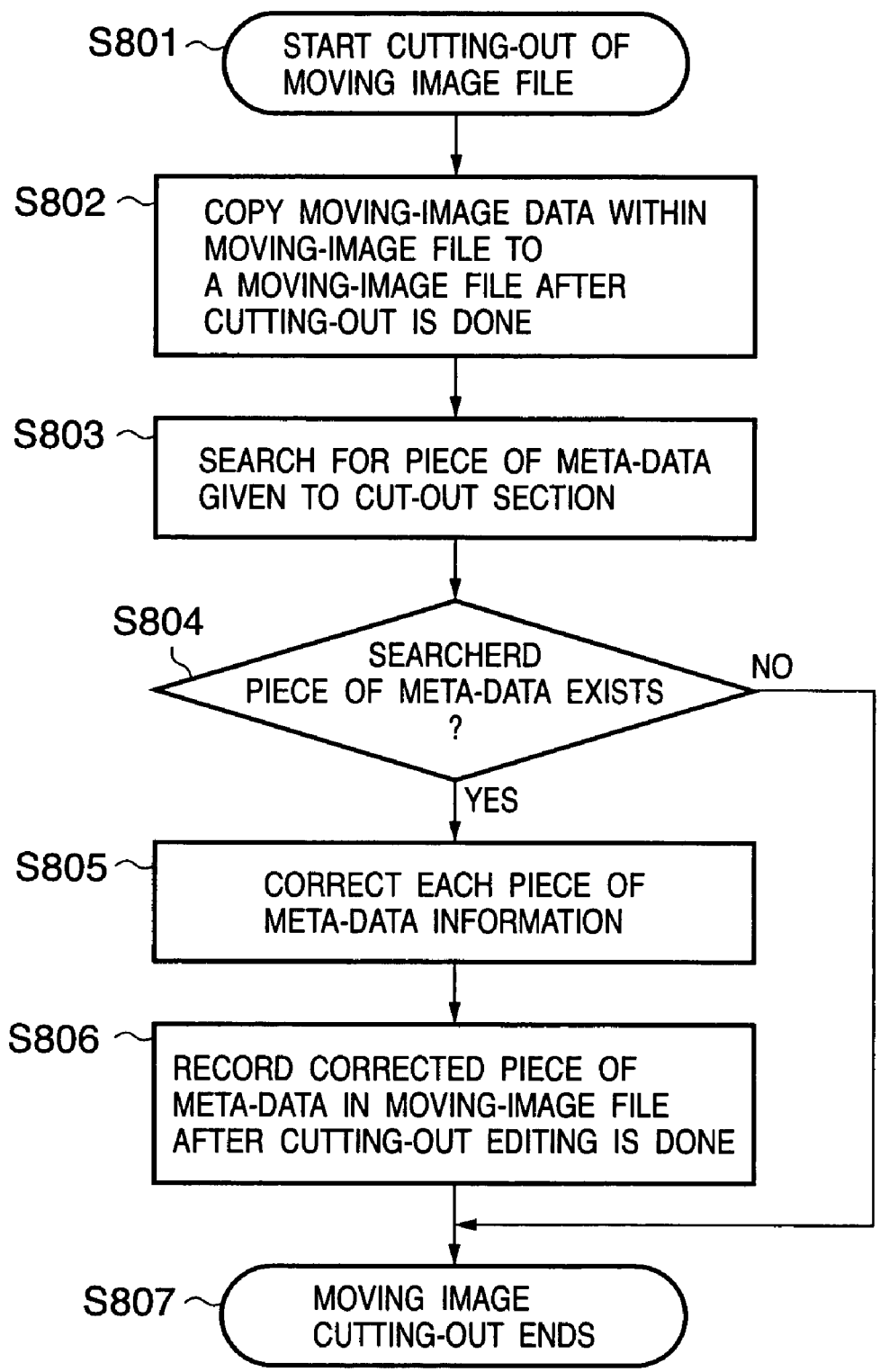

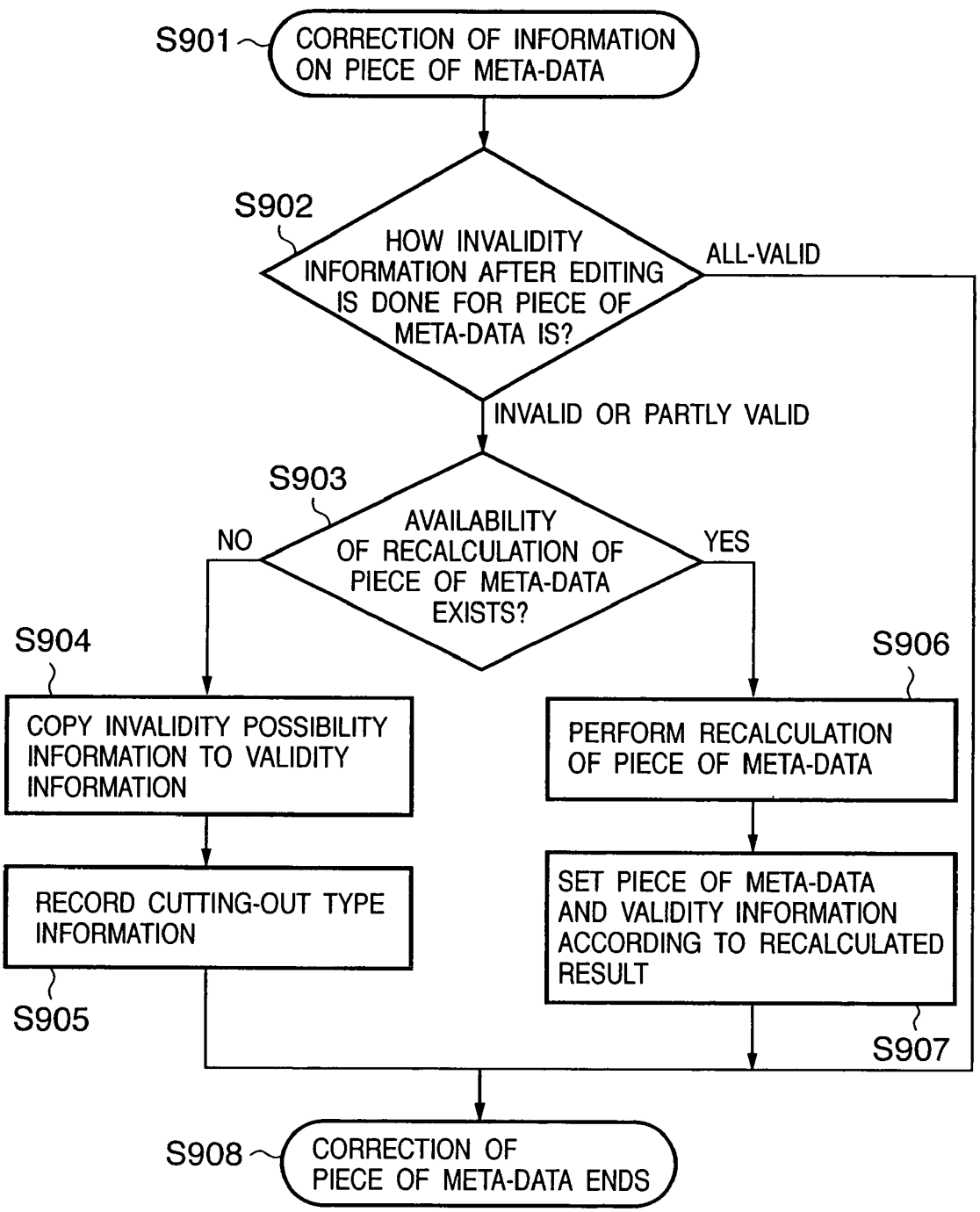

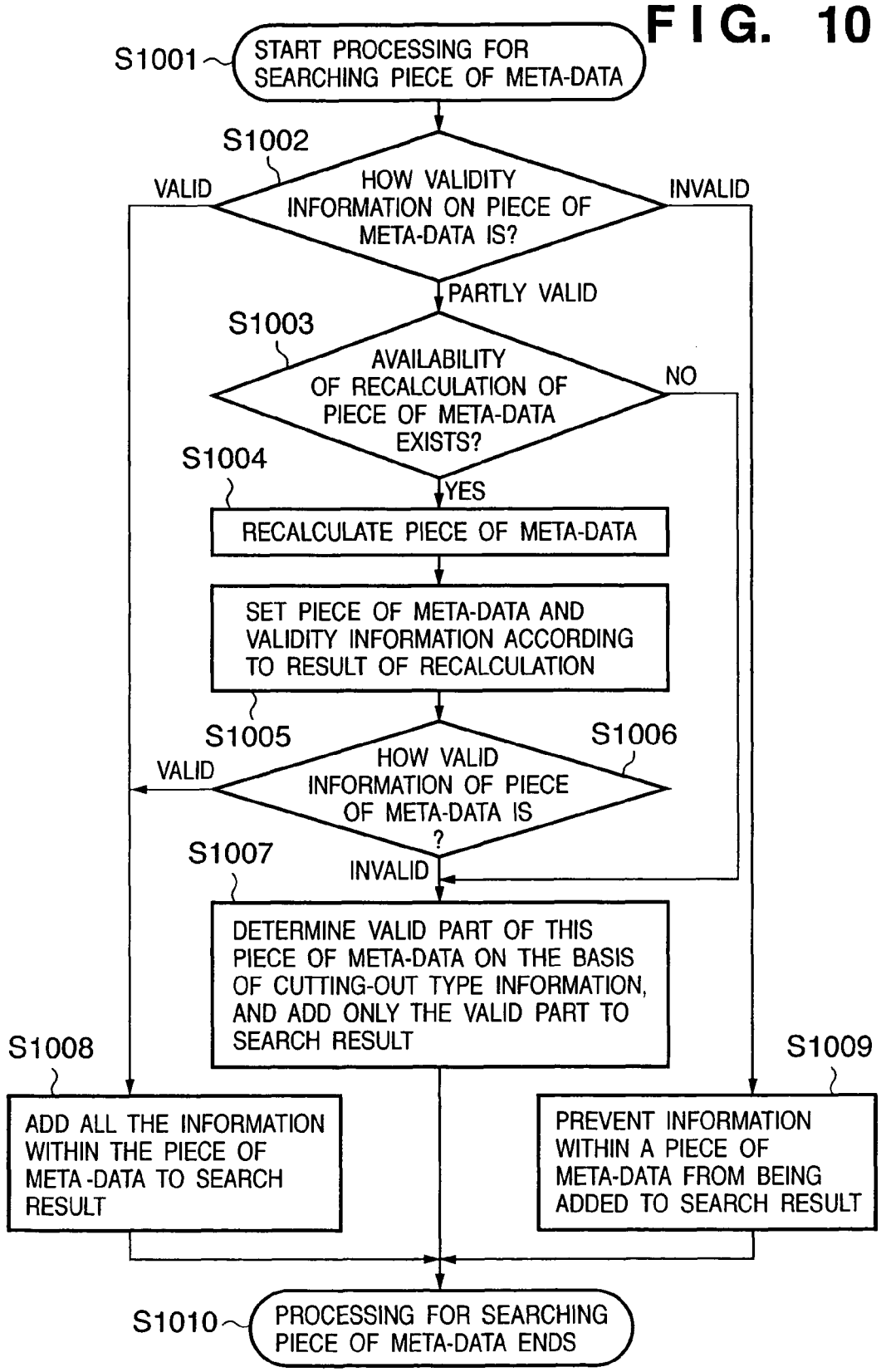

MOVING IMAGE MANAGEMENT METHOD AND APPARATUS

CROSS REFERENCE TO RELATED APPLICATION

This is a Continuation of Application PCT/JP03/02557, hereby incorporated by reference, filed on Mar. 5, 2003, and published as WO 03/075564 A1 on Sep. 12, 2003, the priority of which is claimed herein (35 U.S.C. §120) and which claims priority of Japanese Application No. 2002-058798 filed Mar. 5, 2002, the priority of which is also claimed herein (35 U.S.C. §119).

TECHNICAL FIELD

The present invention relates to a technique for using multimedia-information such as moving image information. More specifically, the present invention relates to methods for using and storing meta-data, which is additional redundant information on contents of multimedia-information for efficient and effective use of the multimedia-information.

BACKGROUND ART

As many devices using multimedia-information have recently been emerged, various methods for accessing and using the multimedia-information have been proposed and have come into practical use. There are many types of multimedia-information including sound, a still image, and a moving image. Devices for handling a very large amount of information, such as still-image information or moving-image information, and methods for accessing and using such information have already been come into practical use. To use such information as moving-image information or still-image information, a device provided with a large capacity and high throughput is required.

To effectively access and use multimedia-information such as still-image information or moving-image information, other than a technique for directly processing still-image information or moving-image information itself, for example, there has been developed a technique for redundantly saving information representing the contents and characteristics of the image information in a relatively easy form for handling, which is expected to be referenced and used for handling the still-image information or the moving-image information. This redundant information is generally called "meta-data", which has been incorporated in more standards for a recording format, for example, of still-image or moving-image. Recently, a standard only for the standard for formatting the meta-data has also appeared.

Main purposes of the current methods for using meta-data are to search for image information and the like. And there are various contents of meta-data. In case of moving-image information, various types of meta-data are used including contents of the moving-image information, information on shooting location and a shooting device, information on a shot object, quantitative characteristics and typical parameters of color and sound of the moving image. The multimedia information tends to increase in size along with improvement in sound and image quality, which apparently leads more active use of meta-data. In addition, there will be more variations in content of meta-data.

Under such a condition, a system with object-oriented data management method is provided in Japanese Patent Laid-Open No. 08-077116 or No. 11-312081. To disperse loads, the system is provided with a central processor for determining a device or a program responsible for each process by using an object (data) and an attribute (meta-data) for referencing the attribute and each state, so that an appropriate process can be directed to an appropriate processing part. However, these systems have some problems: They cannot dispense with a central processor and they cannot process any data which requires a processing method that cannot be dealt with each of the included devices.

Under a condition with various and extensive types of meta-data, it is not easy to provide a device or a method that supports all the meta-data. Thus, such a device and a method always have a high possibility of encountering an unknown or unsupported type of meta-data, or a type of meta-data that cannot be processed on account of throughput or memory thereof. Therefore, it can be expected that a method is required which efficiently processes such an unknown or unsupported type of meta-data or any type of meta-data that cannot otherwise be processed when the device comes across such a type of data. The current standards for meta-data are mainly intended for a search usage, and therefore, an approach concerning an effective usage of meta-data other than the search usage (e.g. editing usage) is few.

As mentioned above, there are various types of meta-data, usage pattern, a way of use, or a storing way of meta-data, with a tendency to increase.

Multimedia information includes several types of information which can be edited in various ways such as moving-image information. When moving-image information added with a piece of meta-data is edited, for example, the added piece of meta-data can be inconsistent with the contents of edited moving-image. If contents of the inconsistent piece of meta-data are not updated, the piece of meta-data cannot be used correctly. However, as mentioned above, there are too many types of meta-data for a device editing a moving-image to appropriately update a piece of meta-data, which is an unknown to or unsupported by the device. Thus, one or more pieces of meta-data are left incorrect.

Therefore, it is important to have a method for facilitating a process involved with above-mentioned updating of apiece of meta-data to make a piece of meta-data always adapted to an appropriate use. Such kind of method is necessary under an environment where a piece of meta-data is frequently used.

DISCLOSURE OF INVENTION

The present invention is adopted in view of the above-mentioned problems and intends to allow a piece of meta-data added to a moving-image, even if it is unknown or unsupported, easily to be adapted and be used after the moving-image is edited.

According to one aspect of the present invention, the above-described object is attained by a moving image management device for recording and managing one or more pieces of meta-data for a part or all of a moving-image for multiple moving-images recorded on a recording medium, comprising:

means for recording alteration information indicating an alteration of validity of the piece of meta-data for each of the one or more pieces of meta-data, the alteration of validity resulting from an editing operation of a part of a moving-image that is an object of the piece of meta-data; and means for recording validity information indicating validity of the piece of meta-data in the same storing form as that of the alteration information, for each of the one or more pieces of meta-data.

According to another aspect of the present invention, the foregoing object is achieved by a moving image management method for recording and managing one or more pieces of meta-data for a part or all of a moving-image for multiple moving-images recorded on a recording medium, comprising the steps of:

recording alteration information indicating an alteration of validity of the piece of meta-data for each of the one or more pieces of meta-data, the alteration of validity resulting from an editing operation of a part of a moving-image that is an object of the piece of meta-data; and recording validity information indicating validity of the piece of meta-data in the same storing form as that of the alteration information, for each of the one or more pieces of meta-data.

Other features and advantages of the present invention will be apparent from the following description taken in conjunction with the accompanying drawings, in which like reference characters designate the same or similar parts throughout the Figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 6 is a table for showing allocation of values for validity information and invalidity information on a piece of meta-data according to the embodiment;

FIG. 7 is a table for showing allocation of values for cutting-out type information on a piece of meta-data according to the embodiment;

FIG. 8 is a flow chart for showing a general flow of a cutting-out process of a time section for a moving-image file according to the embodiment;

FIG. 9 is a flow chart for showing a general flow of processing a piece of meta-data during a cutting-out process for a time section for a moving-image file according to the embodiment; and FIG. 10 is a flow chart for showing a general flow of searching a piece of meta-data after a cutting-out process for a time section for a moving-image file according to the embodiment.

BEST MODE FOR CARRYING OUT THE INVENTION

Preferred embodiments of the present invention will now be described in detail in accordance with the accompanying drawings.

First, with reference to FIG. 1, relationship between a piece of moving-image data and a piece of meta-data handled by a moving-image processor according to the embodiment and a condition where editing of a piece of moving-image data makes a piece of meta-data inconsistent will be described along with an outline of managing a piece of meta-data according to the embodiment.

In the embodiment, information on whether a value or each of multiple values of meta-data requires recalculation after information such as image-information is edited or the value remains still valid even after editing is finely given.

From the viewpoint of recording and using a piece of meta-data, it can be convenient to store multiple relevant values and the like together in information on one piece of meta-data. In particular, in the case that a function of using such multiple values at a time, it is more convenient to obtain values of each piece of meta-data at a time than to obtain each of the values respectively through multiple processes.

If multiple values of a piece of meta-data that are used together are stored together for easy fetch at a time, and pieces of information on whether a value of image information, for example, needs recalculation after editing has done or remains valid after editing has done can be given together, there is another advantage of increasing both recording efficiency and storing efficiency as well as of facilitating a fetch of information for use than in the case that each piece of information is given for each piece of meta-data. However, the property whether a value of meta-data needs recalculation when a piece of image information is edited or remains valid after the piece of image information is edited is actually not always the same for every value of meta-data organized together.

Figure 1:
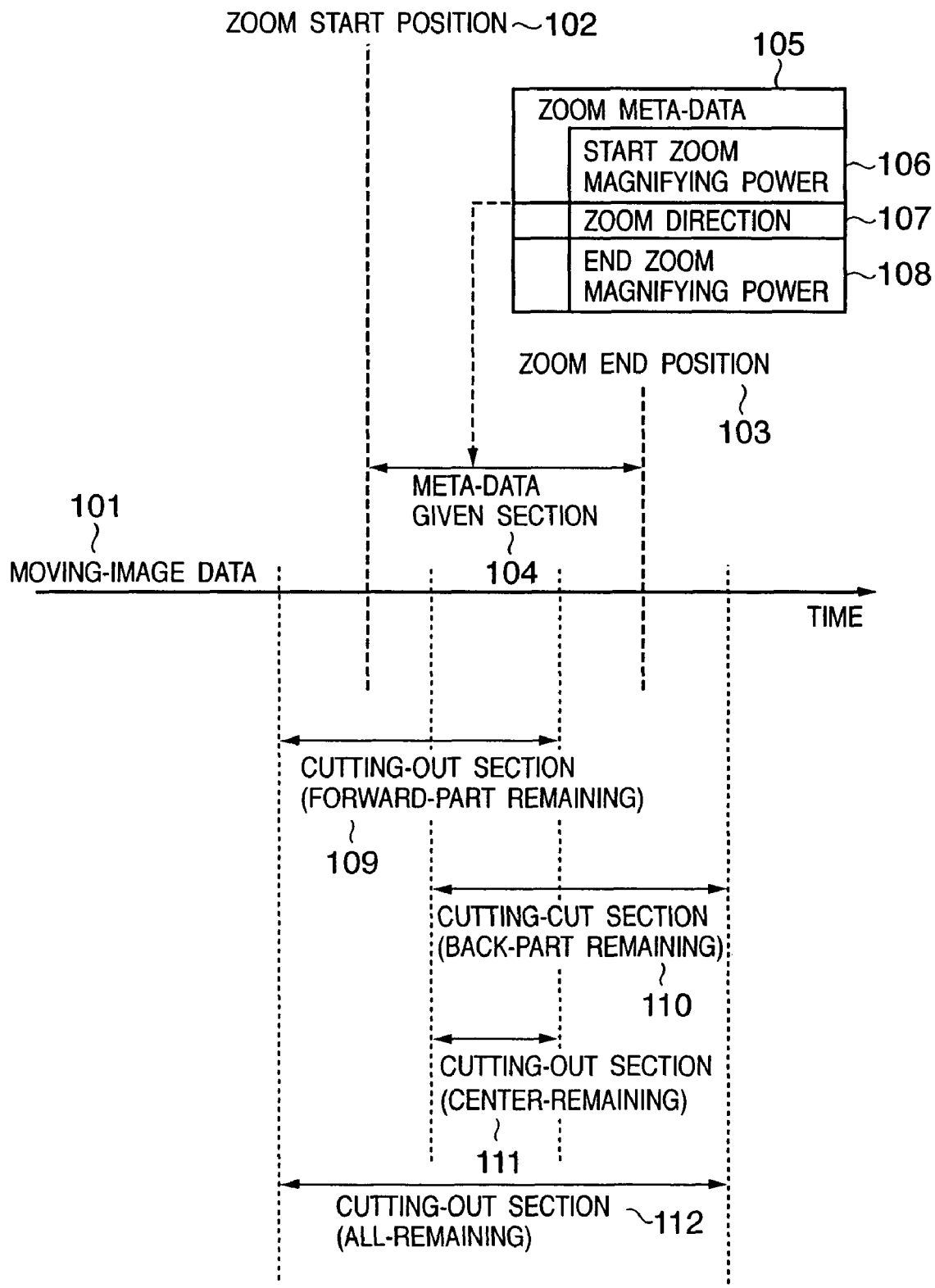
FIG. 1 is a diagram showing exemplary meta-data which requires the present invention.

FIG. 1 shows an example of a piece of meta-data with such a problem. As an example, zoom meta-data 105 recording a piece of information on a zoom action in a shoot will be considered.

As shown in FIG. 1, moving-image data 101 exists as a piece of moving-image information, with zoom meta-data 105 given for a time section between zoom start position 102 and zoom end position 103. From the viewpoint of zoom meta-data 105, meta-data is given to a time section between zoom start position 102 and zoom end position 103, which is meta-data given section 104. The zoom meta-data 105 is a piece of information showing that the image was shot with a zoom action in the meta-data given section 104, which is a kind of meta-data accompanying a piece of moving-image data.

The zoom meta-data 105 consists of three values. One of the values is start zoom power 106 storing a value of a zoom power at zoom start position 102. Another one of the values is zoom direction 107 indicating whether a zoom-in action was taken for changing a shooting direction into a direction for shooting an object magnified in the center (TELE) or inversely, a zoom-out action was taken for shooting more things as an object (WIDE). The last one of the values is end zoom power 108 storing a value of a zoom power at zoom end position 103. The three values have a high possibility of being used simultaneously for performing a search concerning a zoom action or interpretation of contents of an action. For this reason, the three values are stored as one piece of meta-data (zoom meta-data 105) and stored in a form to be easily read out.

In the case that a section of moving data 101 is cut out to be recorded as a new piece of moving-image information, respective values within the zoom meta-data 105 are different in reusability.

For example, consider the case that when moving-image information is cut out in cutting-out section 109, zoom meta-data given section is changed to a section between zoom start position 102 and the end of cutting-out section 109 to leave the zoom-meta-data in the cut moving-image information. In this case, start zoom power 106 and zoom direction 107 are consistent with the cut moving-image information, thus, a correct value. However, end zoom power 108 is different from a zoom power at the end of cutting-out section 109 in value, thus, an incorrect value.

It is same in the case when cutting-out section 110 is cut from moving-image data 101, meta-data given section is changed to a section between the start of cutting-out section 110 and zoom end position 103 to leave the piece of information in the cut moving image information. In this case, values of end zoom power 108 and zoom direction 107 are correct. However, start zoom power 106 is incorrect. In the case that cutting-out section 111 is cut and meta-data given section is changed to cutting-out section 111 to leave the piece of meta-data in the cut moving-image information, a value of zoom direction 107 is correct, while values of start zoom power 106 and end zoom power 108 are incorrect.

It is matter of course that if image information is cut out to include all the meta-data given section 104 such as cutting-out section 112, all the three values in zoom meta-data 105 remain correct.

As mentioned above, values within a piece of meta-data consisting of correct values, changes into values including correct ones and incorrect ones depending on a part of moving-image information to be cut out. As it is apparent from the description above, there is a property that which part of meta-data given section left determines whether a value of a piece of meta-data remains valid according to a property of each value. For example, validity of start zoom power 106 shown in FIG. 1 is determined on the basis of whether zoom start position 102 remains in cut-out meta-data given section or not.

As devices and means using a value of the meta-data make use of a property of a value of this meta-data, a property of a value of such a meta-data are known to the devices and means in detail. Accordingly, all needed to know the validity of each piece of meta-data is information on how moving-image information was cut out. In contrast, in such a device or means, which does not use a value of meta-data, the meta-data is not referenced. Thus, if it is not known whether the piece of meta-data is still usable or not when a moving-image is cut out, it is also unknown whether it is valid or not to remain the meta-data in the moving-image information.

For this reason, in the embodiment, when a moving-image is cut out, validity of a piece of meta-data is given to each piece of meta-data according to a property of the piece of meta-data for use. Particularly in the case that a single piece of meta-data has a plurality of values with different properties, a value indicating those values are all valid, partly valid, or all invalid is given. The embodiment also saves information indicating how the moving-image was cut out (for example, information indicating any one of all-remaining, forward-part-remaining, back-part-remaining, and center-remaining)

In this manner, if it is a piece of meta-data that is all valid after editing is done, all the values within the piece of meta-data are known to be usable in referring to the piece of meta-data. If it is a piece of meta-data that is partly valid after editing is done, it can be determined which value is valid by referring to information on how the cutting-out was performed so that only valid values can be used. If it is a piece of meta-data that is all invalid after editing is done, it is known that all the values within the piece of meta-data are unusable.

In this manner, pieces of information on validity can be added together. Thus, efficiency of storing and memorizing information can be higher and multiple values within a piece of meta-data that is frequently handled simultaneously can be memorized and managed more simply than in a way that validity information on each of multiple values within a piece of meta-data is added if there are such multiple values. This is a very effective way in a device or means that frequently uses a piece of meta-data because it can perform, for example, a search for a piece of meta-data efficiently.

Some devices or means can recalculate a piece of meta-data and store the correct value. In this case, the device or means are supposed to perform the recalculation. However, it is also possible to make all the values or the values as many as possible within a piece of meta-data to be valid by correcting values, updating values of a piece of meta-data and the added information and storing the update.

There is another way where validity of meta-data is determined other than at the moment of editing moving information by cutting-out. The determination can be done at the moment of using meta-data, for example, at the moment of a search for a piece of meta-data afterwards. In other words, validity information indicating if the current piece of meta-data is all valid, partly valid, or all invalid, invalidity information indicating if a piece of meta-data remains all valid, or becomes partly valid or all invalid when cutting-out editing is done, and cutting-out information indicating how the cutting-out was performed are added to each piece of meta-data. Validity information and invalidity information have the same form. By adopting this data format, it is possible to implement the following things:

(1) By using validity information and cutting-out information, validity of each value within a piece of meta-data can be determined as described above. Validity information on a piece of meta-data can be referenced and checked for usability of a piece of meta-data. Only for the case of partly valid, it is determined whether the piece of meta-data is valid or which value within the piece of meta-data is valid by referring to cutting-out information. In this manner, it can be determined validity for the piece of meta-data or a value within the piece of meta-data with small storage and by simple process. Other than a piece of meta-data that is absolutely processed by a device or means, there can be a piece of meta-data, which is not supported by a device or means, or whose specification is settled after manufacturing of a device or means and unknown to the device or means. However, the above-mentioned process can be applied to any of the cases. In other words, meta-data, whatever type of data it is, can be appropriately maintained and be used by referring to validity information on a piece of meta-data to check usability of the piece of meta-data at the time of editing a moving image or using a piece of meta-data.

(2) Correct validity information on the current piece of meta-data can be set simply by copying invalidity information indicating invalidity of a piece of meta-data in the case that a piece of moving-image information is cutting-out edited to validity information on the current piece of meta-data, even if the device or means that performed the cutting-out editing of the piece of moving-image information cannot update the piece of meta-data. In order to set correct validity information on the current piece of meta-data just by the above-mentioned copying process, it is important for validity information on the above-mentioned current piece of meta-data and invalidity information on a piece of meta-data where moving-image information is subjected to cutting-out edition to be in the same form. Cases that a piece of meta-data cannot be correctly updated include the case that no device or means supports the meta-data, or the case that recalculation of a piece of meta-data cannot be done on account of specification of a device or means.

That is to say, although there can be a piece of meta-data which is not supported by a device or means, or whose specification is settled after manufacturing of a device or means and unknown to the device or means, other than one can be absolutely processed by a device or means, the above-mentioned process is effective in any of the cases. The process of copying invalidity information on a piece of meta-data to valid information on the current piece of meta-data in performing cutting-out edition is applicable to any type of meta-data it is, and a piece of meta-data can be correctly maintained just by a very simple copying process; these merits make it possible to implement easily a device for using a piece of meta-data.

(3) When editing or a search for moving-image information is performed, validity of a piece of meta-data can always be correctly set for validity information on a piece of meta-data indicated by invalidity information on a piece of meta-data, validity information on the current piece of meta-data, and cutting-out information on cutting-out, whatever the type of the piece of meta-data it is. For this reason, even a piece of meta-data, which is not supported by a device or means, or whose specification is settled after manufacturing of a device or means and unknown to the device or means is guaranteed to be processed like a piece of meta-data which is supported by a device or means. As determination for validity information done in editing or searching for moving-image information may be processed at the moment of editing or searching, the determination process can be implemented on a device or means when required. And the process can be implemented in quite simple way.

As mentioned above, in addition to including a function of keeping consistency of moving-image information and a piece of meta-data thereof correct, validity information on each piece of the meta-data can be set correctly, and processes thereof can be distributed among each function, device and approach including editing and searching and the processes can be implemented when required. Therefore, in various devices or means using a piece of meta-data, functions can be always provided by trusting the piece of meta-data, which allows a powerful function using a piece of meta-data to be implemented and high degree of freedom can be accomplished in performing the implementation.

As summarized above, in a manner which uses a piece of meta-data added as redundant information allowing a search and editing of moving-image information to be used easily, the embodiment uses information allowing the piece of meta-data to be used effectively, i.e., a piece of data as so called meta-data for meta-data. As mentioned above, when information such as moving-image is edited or processed, a state of each piece of meta-data such as it is usable, unusable or partly usable changes. The embodiment is characterized by allowing a piece of meta-data to be correctly used in a simple way by using meta-data of meta-data even after the data is edited or processed.

As there are various types of meta-data, it is impracticable to consider a condition where all the devices and processing manner can process contents of all types of meta-data. Generally, types of meta-data that can be processed are limited for each device or processing manner. For this reason, it is easily considered the case that there is a piece of meta-data that is not supported by a device or means or a piece of meta-data unknown to a device or means. The embodiment comprises a characteristic allowing the above-mentioned process or determination to be done even under such a condition.

A moving-image processor according to the embodiment summarized above and described in detail below allows editing of, processing of and searching for moving-image to be correctly performed with quite simple process by ignoring unusable piece of meta-data and using usable piece of meta-data even after the moving-image is edited or processed.

Figure 2:
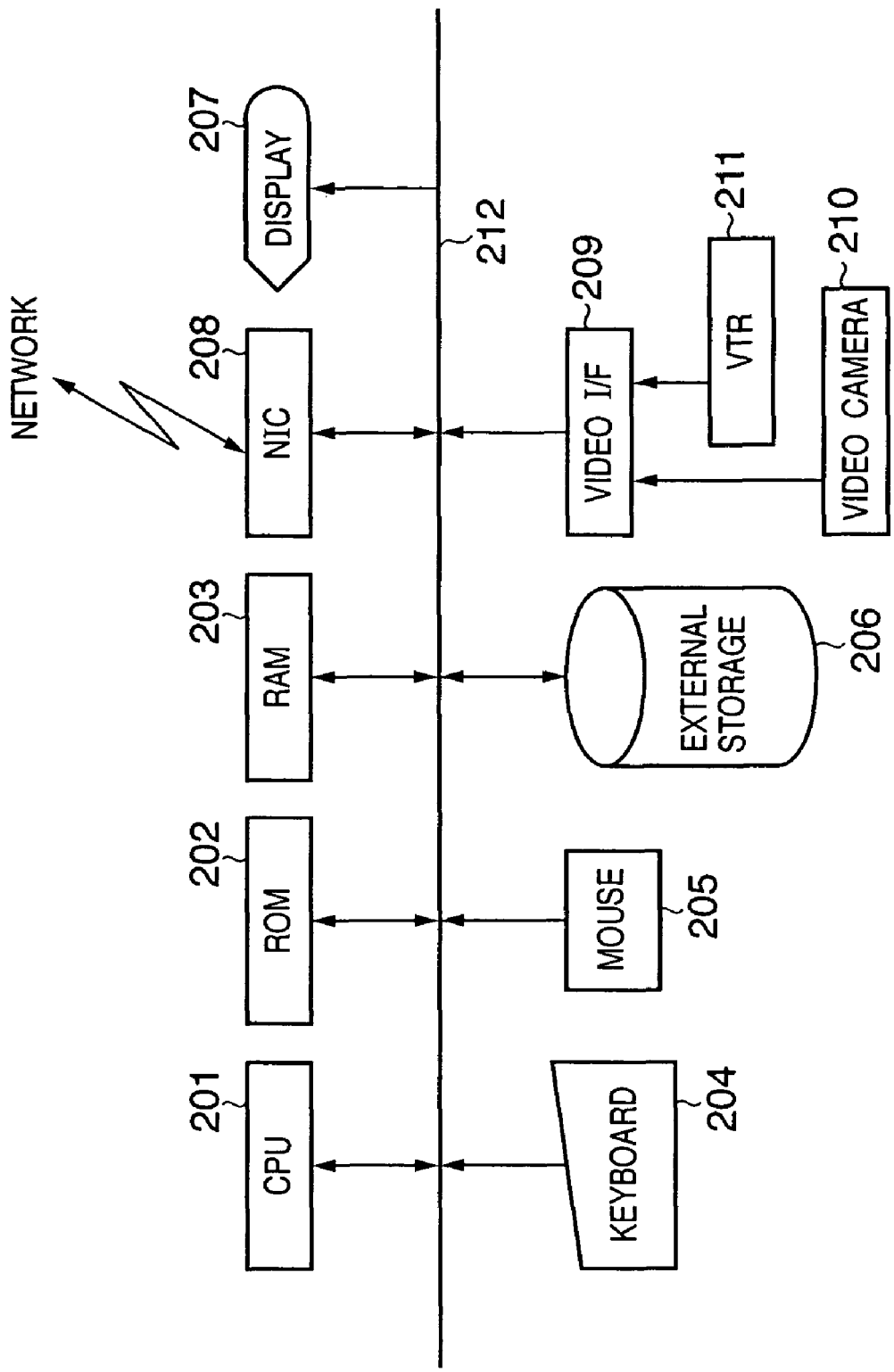
FIG. 2 is a block diagram showing a controlling mechanism of a moving-image processor according to the embodiment.

FIG. 2 is a block diagram showing a controlling mechanism of a moving-image processor according to the embodiment. In FIG. 2, reference numeral 201 denotes a CPU, which performs various types of control in a moving-image processor according to the embodiment. Reference numeral 202 denotes ROM, which stores a boot program, which is executed at booting up of the processor, or various types of data. Reference numeral 203 denotes RAM, which stores a control program to be processed by CPU 201 and provides a work area with a CPU 201 in executing various types of control. Reference numeral 204 denotes a keyboard, 205 denotes a mouse, both of which provide various environments of input operation by a user.

Reference numeral 206 denotes an external storage consisting of a hard disc or a flexible disk, an optical disc, a magnetic disc, a magneto-optical disc, a magnetic tape, etc. Reference numeral 207 denotes an indicator consisting of a display and the like and displays such things as results to a user. Reference numeral 208 denotes a network interface, which allows communication with respective devices on the network. Reference numeral 209 denotes a video interface, which allows moving-image to be fetched from video camera 210 or VTR 211. Reference numeral 212 denotes a bus to connect respective components mentioned above. Video camera 210, VTR 211, and external storage 206 can be substituted with ones placed-on the network in the above-mentioned configuration.

Figure 3:
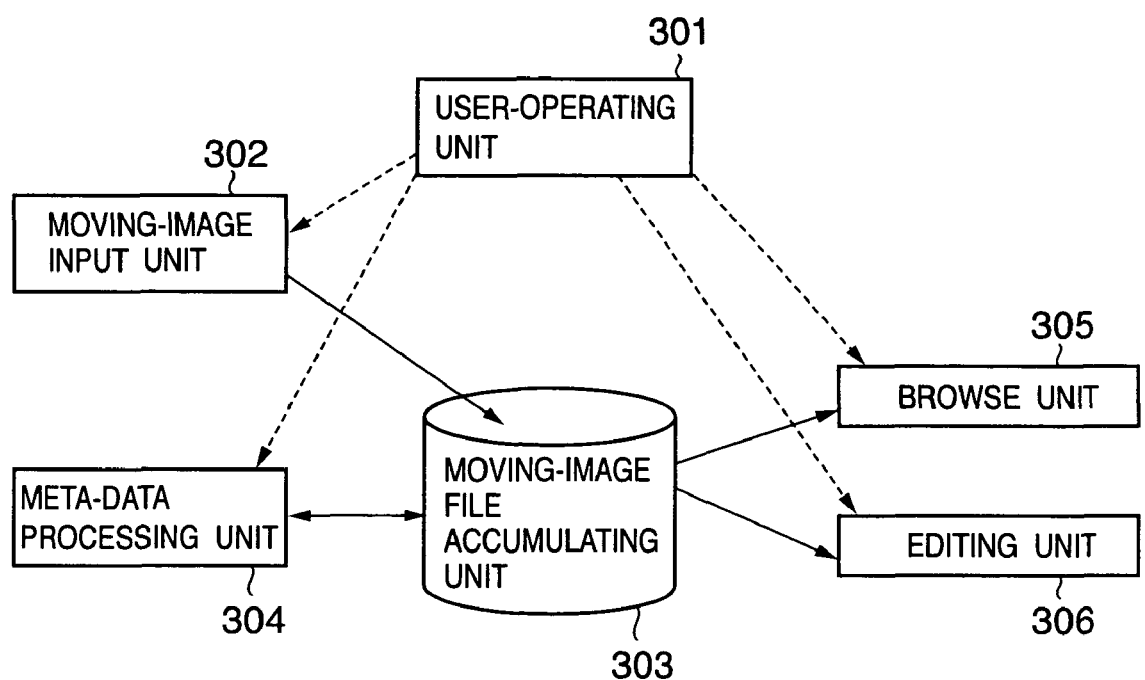
FIG. 3 is a block diagram showing a functioning mechanism of a moving-image processor according to the embodiment.

FIG. 3 is a block diagram showing a functioning mechanism of a moving-image processor according to the embodiment. Reference numeral 301 denotes a user-operating unit, which obtains an indication or input from a user through keyboard 204 or mouse 205. Reference numeral 302 denotes a moving-image input unit, which reads out moving-image from video camera 210, VTR 211 and the like through video I/F 209 and inputs the image into the device. Reference numeral 303 denotes a moving-image file accumulating unit, consisting of external storage 206, which accumulates moving-image input by moving-image input unit 302 and a piece of meta-data thereof into a file.

The moving-image processor not only accumulates and records moving-image but also a piece of meta-data thereof to use the meta-data for allowing a search or editing for the moving-image is easily performed. The part for performing various processes and calculations as an addition or alteration to the meta-data is meta-data processing unit denoted by reference numeral 304. Browse unit 305 is a component for showing moving-image within moving-image file accumulating unit 303 to a user according to an operation of the user. Editing unit 306 edits moving-image within moving-image file accumulating unit 303 according to an indication from a user.

The moving-image processor is configured in the above-mentioned manner having a function for showing moving-image to a user and a function for creating a moving-image file that is desired by a user by editing moving-image information.

Figure 4:
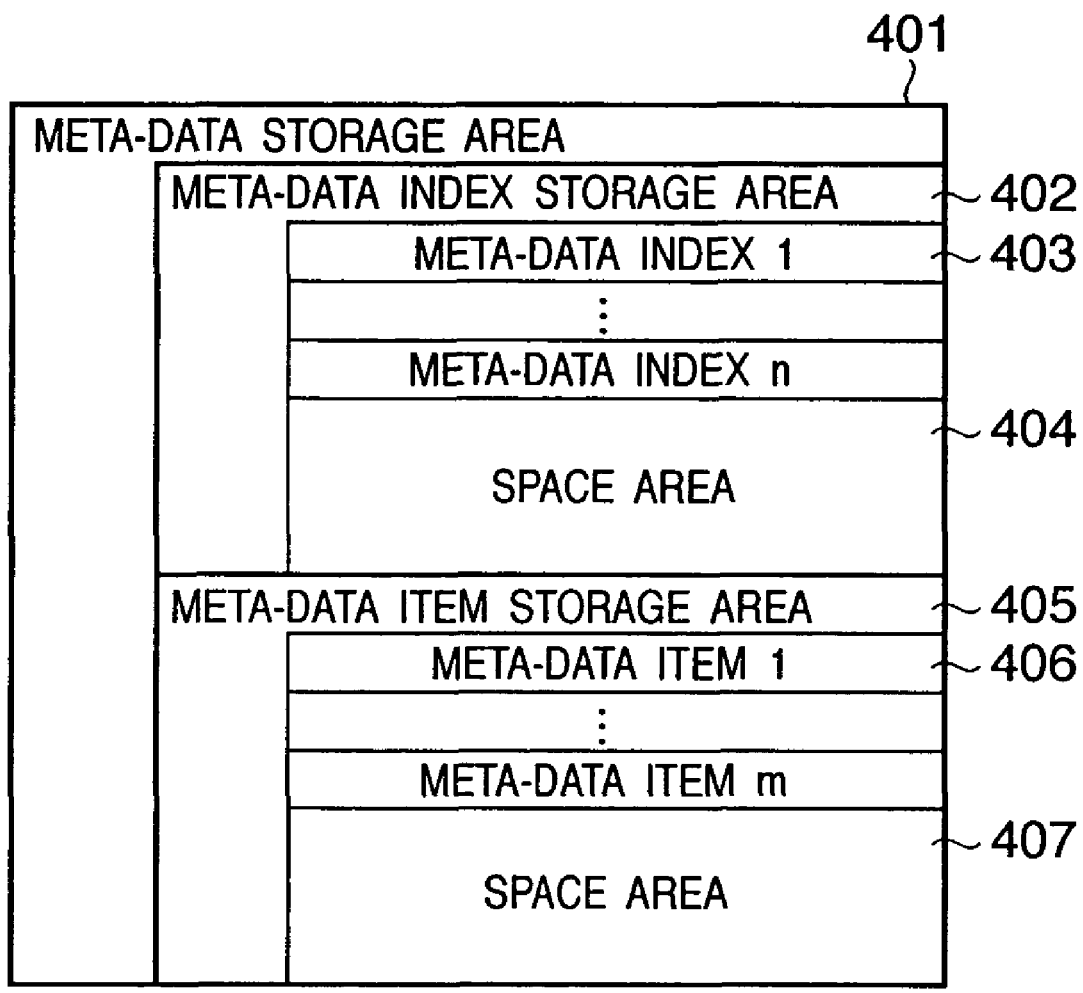
FIG. 4 is an overview of a storing form of a piece of meta-data within a moving-image file according to the embodiment.

FIG. 4 shows a storing form of meta-data included in a moving-image file that is recorded in moving-image file accumulating unit 303. In this moving-image file, moving-image information as well as a piece of meta-data concisely representing such information as contents of the moving-image information are attached. That is to say, a moving-image file has a moving-image storage area and a meta-data storage area. The storing form shown in FIG. 4 illustrates a configuration within the meta-data storage area.

Inside of meta-data storage area 401 is divided into two parts; meta-data index storage area 402 and meta-data item value storage area 405. Meta-data index storage area 402 has a configuration of several meta-data indices 403 in a fixed length and a remaining area as a space area 404. Meta-data item value storage area 405 has a configuration of several meta-data items 406 in variable lengths and a remaining area as a space area 407.

Meta-data index 403 is in fixed length in order to store information mainly used in searching for a piece of meta-data allowing a moving-image processor according to the embodiment to perform such a process as a search in simple and speedy manner. Meta-data item 406 is invariable length, for a storage area required for storing a meta-data item value is in a variable length or information that is too large to be stored in meta-data index 403. In other words, meta-data item 406 is provided to allow information of variable length with high possibility of its length being changed or comparatively larger information to be handled easily.

Figure 5:
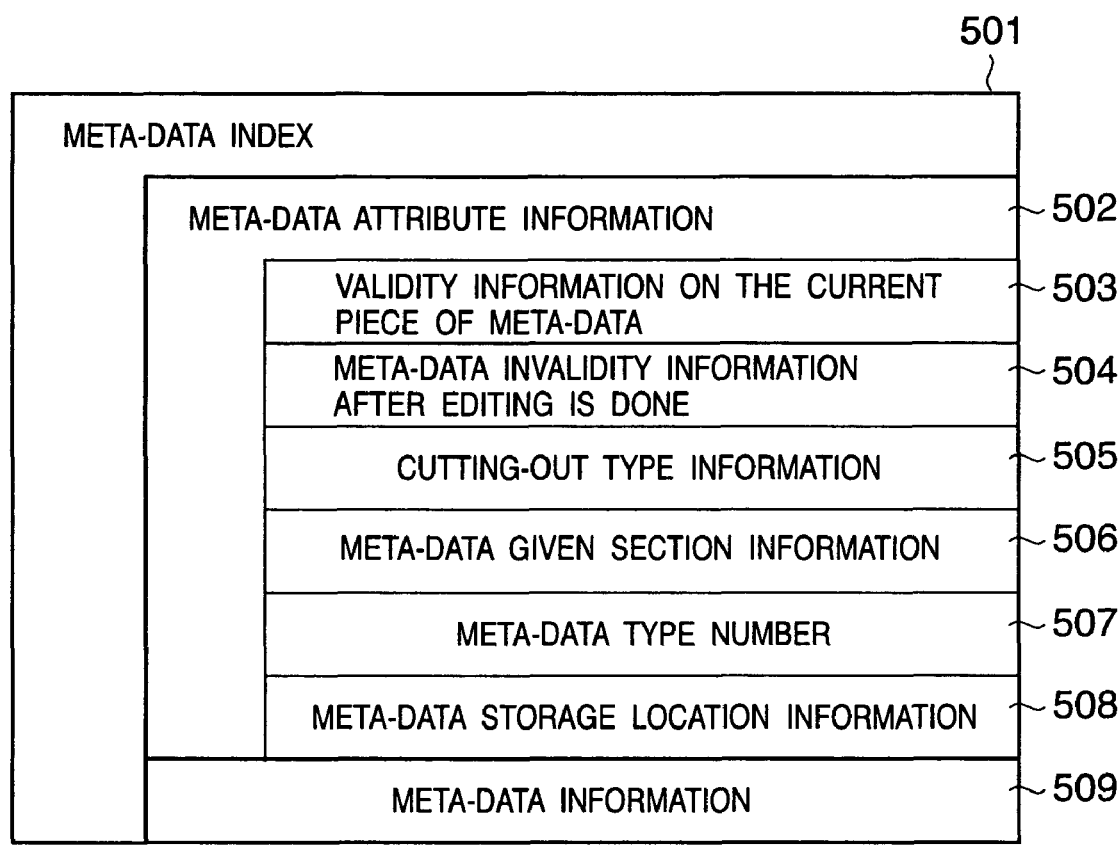
FIG. 5 is an overview of a storing form of each piece of meta-data within a moving-image file according to the embodiment.

FIG. 5 shows inner configuration of meta-data index 403 shown in FIG. 4, which has several items in a fixed length starting with meta-data index 501. Inside of meta-data index 501 is largely divided into two; meta-data attribute information 502 and meta-data information 509. Meta-data attribute information 502 is further divided into inner components including validity information on the current piece of meta-data 503, meta-data invalidity information after editing is done 504, cutting-out type information 505, meta-data given section information 506, meta-data type number 507, and meta-data storage location information 508.

Meta-data type number 507 is information for identifying a piece of meta-data where an identification number is allocated to each piece of meta-data, such as number 10 for zoom information at the time of shooting, and being stored. With this number, a moving-image processor can search for a specific piece of meta-data within a moving-image file. Meta-data given section information 506, which is a representation of a section of moving-image data that is an object of meta-data in time information, and is intended for indicating a single scene or cut within a moving-image.

With the above-mentioned information 506 and 507, the moving-image processor can search for a piece of meta-data given to a specific section within a moving-image. For example, when a user wants to search a scene that zooms up an important object, the desired scene can be found by searching for a piece of meta-data with a meta-data identification number of zoom information at shooting, selecting a piece of meta-data storing that it was zoomed up, and checking the meta-data given section in the data. In contrast, when a user indicates a specific time section, the user can know how many parts in the image shot for an important object are there by searching for a piece of meta-data which zooms up. By storing a part that stores information to be used in a search into a specific location within meta-data index 501 in a fixed length size, the moving-image processor can intensively and easily search this part.

Meta-data storage location information 508 indicates whether a piece of meta-data itself is stored in meta-data information 509 or meta-data item 406 shown in FIG. 4. Meta-data storage location information 508 is for adding to flexibility: If a piece of meta-data is small enough for a storage size, store the data in meta-data information 509, which is a storage area in a fixed size, and if a piece of meta-data is too large or in a type of dynamically changes in its size, store the data in meta-data item 406. With a value of the meta-data storage location information 508, it can be determined which area stores contents of a piece of meta-data.

Meta-data information 509 differs in meaning according to a value stored by meta-data storage location information 508. If a value in meta-data storage information 508 indicates that a piece of meta-data is stored in meta-data information 509, contents of a piece of meta-data itself are to be stored. If a value in meta-data storage information 508 indicates that a piece of meta-data is stored in meta-data item 406, a number, which indicates which one of the meta-data items stores contents of a piece of meta-data, is stored as meta-data information 509. The meta-data information, stores a piece of meta-data such as reference numeral 105 shown in FIG. 1, which stores one or more values. As one or more value, a value indicating "no information" may be stored. This is because that some devices, which created a piece of meta-data, do not have a function of creating all the values within the piece of meta-data.

Reference numeral 503 denotes validity information on the current piece of meta-data, and 504 denotes invalidity information on a piece of meta-data after editing is done. FIG. 6 is a table showing allocation of values in validity information on the current piece of meta-data 503 shown in FIG. 5 and invalidity information on a piece of meta-data after editing is done 504. Both of the validity information on the current meta-data 503 and the invalidity information on a piece of meta-data after editing is done 504 have the same size for storage of two bits, the same allocation as it is shown in FIG. 6, and the same recording form.

The validity information on the current piece of meta-data 503 is for storing the current state of the piece of meta-data. Where a piece of meta-data stores one or more value, the validity information on the current piece of meta-data 503 stores the information on the state if the values are in the state of all-valid or partly-valid or all-invalid by means of a value of validity information (two bits) shown in FIG. 6. The partly valid state is not the information on validity of a piece of meta-data itself. The partly valid state would be a piece of information reflecting information on validity by focusing on one or more values within a piece of meta-data, representing a simplest example of typical values. The invalidity information on a piece of meta-data after editing is done 504 is for storing which state does the piece of meta-data validity information change into when a piece of information on moving-image is cut out for the meta-data given section. In other words, where one or more values are stored in a single piece of meta-data, the invalidity information on a piece of meta-data 504 stores, by using a value of invalidity information (two bits) shown in FIG. 6, a state if the values are in the state of all-valid or partly-valid or all-invalid even after cutting-out operation is performed for moving-image information is performed. Also, the partly valid state is not the information on validity of a piece of meta-data itself as in the above-mentioned case. The partly valid state would be a piece of information reflecting information on validity by focusing on one or more values within a piece of meta-data, being a representing value.

The fact that the validity information on the current piece of meta-data 503 and the invalidity information on a piece of meta-data after editing is done 504 are in the same form is also important on account of the following reasons.

Moving-image information is cut out to include a meta-data given section, values within a piece of meta-data are in the state of correctly stored by recalculating the value within a piece of meta-data, if required, and recording the result as a value within a piece of meta-data. However, there are some cases that meta-data cannot be recalculated for some reason, or that a recalculation manner for a meta-data is unknown. In such cases, validity of the meta-data can be set by copying the invalidity information on a piece of meta-data after editing is done 504 to meta-data validity information 503 without updating a value of the meta-data.

There are various types of meta-data; some types of meta-data remain valid and others become invalid after a piece of moving-image information in given section is cut out. When there are multiple values in apiece of meta-data, some remaining valid and others becoming invalid are mixed in the piece of meta-data. For example, consider the case that a piece of information is added as a piece of meta-data for a specific time section within moving-image information to indicate that the image is recorded with an outdoor shooting mode of a camera. In this case, even if all or a part of the time section is cut out, the cut out moving image includes a part shot with an outdoor shooting mode of a camera. In other words, at least the overlapped part of cut out time section and the meta-data given section is shot with an outdoor shooting mode. Therefore, the meta-data keeps its validity even after cutting-out editing is done, and all valid (value is 00) is recorded in invalidity information on a piece of meta-data after editing is done 504. As a result, even after the given section is edited, each value of a piece of meta-data is kept valid state by copying invalidity information on a piece of meta-data 504 to validity information 503 without recalculation of the piece of meta-data.

However, for information on zoom shown in FIG. 1, start zoom power 106 is only valid if zoom start location 102 is included in a time section after the image is cut out, and end zoom power 108 is only valid if zoom end location 103 is included in a time section after the image is cut out even under the same process. If such a value is included in a piece of meta-data, invalidity information on a piece of meta-data after editing is done 504 is partly valid (value is 01). Therefore, if a piece of moving-image data within the given section is cut out and the piece of meta-data cannot be recalculated, the invalidity information is copied to validity information 503 on apiece of meta-data and each value within the piece of meta-data becomes partly valid.

FIG. 7 is a table showing allocation of a value of cutting-out type information 505 shown in FIG. 5. If validity information on the current piece of meta-data 503 is partly valid, validity of each value in a piece of meta-data can be known by checking a value of cutting-out type information 505. In the above-mentioned case shown in FIG. 1, start zoom power 106 is valid if a cutting-out type is all-remaining (value is 11) or forward-part-remaining (value is 10), and end zoom power 108 is valid if a cutting-out type is all-remaining (value is 11) or back-part-remaining (value is 01). This meta-data is known to be zoom-meta-data from type information on the meta-data. All the devices, which need to use this piece of meta-data, should know this property of the meta-data. Thus, a valid value within the piece of meta-data can be fetched if there is any cutting-out type information.

Working environment of the embodiment has been described. The procedure in the cases that cutting-out is actually performed for a specific time section in editing the moving-image information in such an environment and that a search for a piece of meta-data is performed for the edited moving-image information also in such environment will be described below.

FIG. 8 is a flow chart for showing a general flow of a cutting-out editing of moving-image information including a piece of meta-data in the embodiment.

Step S801 is a starting point of cutting-out process of a moving-image file. In step S802, the original moving-image data within the moving-image file is copied into a moving-image file after cutting-out is done. Although there are various manners to perform the process, any manners will do only if the purpose of the embodiment is accomplished. For example, there can be a case that a moving-image file is updated on the file itself without copying or there can be a case that a plurality of moving-image files, which are cut out, are connected to be recorded as a single new moving-image file.

Next, at step S803, a piece of meta-data having a time section overlapping with a cut out time section is searched for. If this searched piece of meta-data is left in a moving-image file after cutting-out editing is done, the piece of meta-data can be used when the piece of moving-image file after cutting-out editing is done. In step S804, it is determined whether a searched piece of meta-data exists or not. If the piece of meta-data is not found, a piece of meta-data needs not to be processed, and the process continues to step S807, where the process ends.

If the searched piece of meta-data is found at step S804, the process continues to step S805. At step S805, correction is performed for making a piece of meta-data valid as much as possible by referring to a piece of information on a time section for cutting-out, correcting meta-data given section information 506 for each of the searched pieces of meta-data, and performing processes such as recalculation of a piece of meta-data if required. The correction of information on a piece of meta-data will be described below with reference to FIG. 9. At step S806, the piece of meta-data corrected at step S805 is recorded in a moving-image file after cutting-out editing is done. Process for a piece of meta-data ends with this process, and the process ends at step S807.

FIG. 9 is a flow chart showing an overview of a process in a part to perform correction to make a piece of meta-data valid as much as possible at step S805 shown in FIG. 8. This process is executed for each piece of meta-data at step S805. Although this example is described as having a function to perform recalculation of a piece of meta-data, this function is not necessary.

Step S901 is a starting point of a correcting process for information on the piece of meta-data. At step S902, it is determined whether this piece of meta-data needs to be corrected. If invalidity information on a piece of meta-data 504 is all valid, it is apparent that such a process as recalculation of a piece of meta-data is unnecessary and that the piece of meta-data or all the values in the piece of meta-data are valid even after the moving-image data is edited. In this case, the process continues to step S908, where a correcting process for the piece of information on the meta-data ends.

If invalidity information on a piece of meta-data 504 is all invalid or partly valid at step S902, the process continues to step S903. At step S903, availability of recalculation of the piece of meta-data is determined. In this step, the type of the piece of meta-data to be determined is determined by using a meta-data type number 507 for the piece of meta-data shown in FIG. 5. Availability of recalculation is determined on the basis of whether the device according to the embodiment has a recalculation function of a piece of meta-data designated by the meta-data type number 507, or whether the device can provide the recalculation function, for example, by using other device or means. In general, a device or means according to the embodiment cannot be expected to have all the recalculating functions of a piece of meta-data for many types of meta-data, thus, a piece of meta-data is determined whether it can be recalculated through the device or means by using its meta-data type number 507.

If it is determined that the piece of meta-data cannot be recalculated, the process continues to step S904. If it is determined that the piece of meta-data can be recalculated, the process continues to step S906.

If it is determined that the piece of meta-data cannot be recalculated, invalidity information on a piece of meta-data after editing is done 504 shown in FIG. 5 is copied to validity information on the current piece of meta-data 503. In this manner, validity information on the current piece of meta-data 503 can be maintained correct. At step S905, cutting-out type information 505 shown in FIG. 5 is set by referring to information on cutting-out of the piece of moving-image data. The process for the case where the piece of meta-data cannot be recalculated ends. Then the process continues to step S908, where a correction process for a piece of information on the piece of meta-data ends.

If it is determined that the piece of meta-data can be recalculated, the recalculation is actually performed for the piece of meta-data at step S906. At step S907, validity information on the current piece of meta-data 503 is correctly set according to the result of the recalculation done at step S906 and the recalculated data is stored in meta-data information 509 or meta-data item 406. The process for the case where the piece of meta-data can be reused ends. Then the process continues to step S908, where a correction process for a piece of information on the piece of meta-data ends.

In this manner, information on possibility of being valid for each piece of meta-data and each value in a piece of meta-data is set correctly even if a device or manner according to the embodiment cannot recalculate a specific piece of meta-data.

FIG. 10 shows an overview of a process for searching a piece of meta-data as an example of using a piece of meta-data. In this case, a device or means according to the embodiment provides a function for giving only a valid piece of meta-data as the search result by searching for a piece of meta-data, while determining validity of the piece of meta-data and a value in the piece of meta-data. Although FIG. 10 includes a process for the case where a device or means according to the embodiment can recalculate the piece of meta-data, the process is not necessary.

Step S1001 is a starting point of a search for a piece of meta-data, which is followed by a flow of processes. At step S1002, validity information on the current piece of meta-data 503 shown in FIG. 5 is referenced and process branches according to the referenced value. If it is indicated to be valid, all the values in the piece of meta-data is usable, thus, the process continues to step S1008, where all the values in the piece of meta-data are added to the search result. Then the process continues to step S1010 where the process ends.

If a value for invalid is indicated at step S1002, the process continues to step S1009, where all the values in the piece of meta-data are prevented from being added to the search result. Then the process continues to step S1001 where the process ends.

If a value for partly valid is indicated at step S1002, recalculation of a piece of meta-data is tried from step S1003 to step S1005. Step S1003 is a part for determining whether the recalculation is possible or not on the basis of meta-data type number 507 shown in FIG. 5. If the recalculation is determined to be impossible, the process continues to step S1007. If the recalculation is determined to be possible, the process continues to step S1004, where the piece of meta-data is recalculated. According to the result, validity information on the current piece of meta-data 503 shown in FIG. 5 is set again and the recalculated piece of meta-data is stored in meta-data information 509 or meta-data item 406 at step S1005. It is matter of course that if all the values in a piece of meta-data are recalculated during recalculation of the piece of meta-data at step S1004, each of the recalculated values is stored in meta-data information 509 or meta-data item 406 as a piece of meta-data and meta-data validity information 503 is set "valid". However, there is a case that correct values are obtained only for a part of the values by recalculation. In the case, the obtained correct values is stored in an appropriate meta-data information 509 or meta-data item 406 as an appropriate value, while a piece information indicating "no value" in meta-data information 509 or meta-data item 406 is stored as an appropriate value and validity information on a piece of meta-data 503 is set "valid". This is for the case which needs this kind of process because a device and the like that performs the process does not necessarily have a function of recalculating all the pieces of meta-data and the values.

At step S1006, the same determination as one done at step S1002 is performed. If all the values in the piece of meta-data become valid by recalculation, the process continues to step S1008. If only a part of values in the piece of meta-data become valid even after recalculation tried and the state of partly valid remains as it was, the process continues to step S1007. At step S1007, a valid value in a piece of meta-data is determined and an only usable value is added to the result of the search according to a property of a piece of meta-data by referring to cutting-out information 505 shown in FIG. 5. Then the process continues to step S1010 and ends. In this manner, only a valid piece of meta-data can be searched.

If validity information on a piece of meta-data indicates all valid at step S1002, or if all the pieces of meta-data become valid by recalculation at step S1006, the process continues to step S1008 and all the pieces of information (values) in a piece of meta-data is added to the search result.

From the above description, when cutting-out edition for a piece of moving-image information is performed in a device or means that does not support all of the existing types of meta-data, the embodiment can correctly set validity information on the piece of meta-data or a value in the piece of meta-data, and that is done by means of a simple function of copying information in spite of the fact whether the piece of meta-data is a type of meta-data that can be used by the device or means.

According to the above-mentioned embodiment, invalidity information (504) on a piece of meta-data after editing is done and process is done for a piece of moving-image and validity information (503) on the current piece of the meta-data that is in the same form as the invalidity information (504) is kept. A piece of information focusing on validity of one value or each of multiple values in a piece of meta-data, which is partly valid, can also be represented in the above-mentioned information. In this manner, it is not only possible to determine whether the current piece of meta-data is usable but also to determine whether a piece of meta-data is valid even after a piece of moving-image is edited and processed. Thus, even in the case that a piece of moving-image is edited and processed, it is possible to identify a usable value among a piece of meta-data by using a property of the meta-data, not to mention to identify a usable piece of meta-data. By using only the usable piece of meta-data or the usable value in the piece of meta-data, a correct piece of meta-data can be used. This is also done in a quite simple manner with efficient memory capacity and storage capacity.

According to the above-mentioned embodiment, if a piece of meta-data which cannot be recalculated are invalidated by editing, invalidity information on the piece of meta-data is copied to validity information (S904). In this manner, the piece of meta-data can be maintained for correct use by a quite simple process of replacing validity information after editing and processing are done with invalidity information.

According to the above-mentioned embodiment, information on an operation of editing and processing (for example, cutting-out type information) is kept in addition to the above-mentioned invalidity information and validity information (S905). In this manner, it can be determined whether a value or each of multiple values in each piece of meta-data is usable or not even at the step of using a piece of meta-data after the piece of moving-image is edited and processed.

According to the above-mentioned embodiment, a piece of meta-data and associated validity information are changed according to a result of recalculation of a piece of meta-data that is tried when an operation of editing and processing is performed (S903, S906, S907). Thus, a piece of meta-data can be recalculated when the piece of moving-image is edited and processed for validating the piece of meta-data. Moreover, validity information on the piece of meta-data is processed to be correct even if such recalculation is performed.

According to the above-mentioned embodiment, it is determined whether pieces of meta-data include an invalid value or not on the basis of the current validity information and information on an operation of editing and processing performed for a part to which the piece of meta-data is given. If an invalid value is determined to be included, recalculation is tried for changing the piece of meta-data and associated validity information according to the result of the recalculation (S1003, S1004, S1005) Thus, it can be appropriately determined whether a value or each of multiple values in each piece of meta-data is valid or not even in using a piece of meta-data after the piece of moving-image is edited and processed. If an invalid value is determined to be included, the value is recalculated and the piece of meta-data and associated validity information can be set.

According to the embodiment, information required for identifying a piece of meta-data is kept in addition to invalidity information, validity information, information on an operation of editing and processing (507) is kept. According to the identification information on a piece of meta-data, each device can easily determine whether the piece of meta-data can be recalculated or not.

According to the above-mentioned embodiment, if it is determined that a piece of meta-data can be recalculated by the device on the basis of an identification information on a piece of meta-data, the recalculation is performed and validity information on the piece of meta-data and associated validity information is changed according to the result (S903, S906, S907, S1003, S1004, S1005). Thus, if it is determined that a piece of meta-data can be recalculated, the recalculation of the piece of meta-data is performed so that the piece of meta-data and associated validity information are processed to be correct. This process can be executed either on a device, which edited the piece of moving-image, or a device, which uses the piece of meta-data.

According to the embodiment, if it is determined that a piece of meta-data cannot be recalculated on the basis of identification information on a piece of meta-data, invalidity information is copied to validity possibility information (S903, S904, S905). Thus, if it is determined that a piece of meta-data cannot be recalculated by the device on the basis of indication information on a piece of meta-data, correct state indication for a piece of meta-data can be accomplished with a quite simple process of copying valid information from invalid information.

The purpose of the present invention can be accomplished regardless of whether each device or means has a function of processing of such a piece of meta-data or not, or whether each device or means has a recalculation function or not. The form of storing information described in the embodiment is only an example, and any form of storing information can be applied if only the form keeps necessary information.

It is a matter of course that the purpose of the present invention can be also accomplished by providing a system or a device with a medium storing a program code of software implementing the above-mentioned embodiment and a computer (a CPU or an MPU) of the system or the device reads out and executes a program code stored on the storage.

In this case, a program code itself read out from the storage implements a function of the above-mentioned embodiment, thus, a medium storing the program code constitutes the present invention.

A storage medium for providing a program code may be any storage medium including floppy disc, hard disc, optical disc, magneto-optical disk, CD-ROM, CD-R, magnetic tape, nonvolatile memory card, or ROM, which can be used.

It is a matter of course that the present invention also includes the case that execution of a program read out by a computer does not only implements the above-mentioned function but also causes OS (operating system) running on a computer to perform all or a part of the actual process according to an instruction of the program code to implement the above-mentioned embodiment.

It is also a matter of course that the present invention also includes the case that after a program code read out from a storage media is written in a memory included in a feature expansion board mounted on a computer or a feature expansion unit connected to a computer, a CPU and the like included in the feature expansion board or the feature expansion unit performs all or a part of an actual process according to an instruction of the program code to implement the above-mentioned function of the embodiment with the processes.

As mentioned above, according to the present invention, a piece of meta-data given to the piece of moving-image can be easily corrected for use.

A many apparently widely different embodiments of the present invention can be made without departing from the spirit and scope thereof, it is to be understood that the invention is not limited to the specific embodiments thereof except as defined in the claims.

The invention claimed is:

1. A moving image management hardware device for recording and managing plural pieces of meta-data for a part or all of a moving-image for multiple moving-images recorded on a recording medium, comprising:
   a unit configured to record invalidity information indicating which one of "valid", "invalid" and "partly valid" states will exist, with regard to each of the plural pieces of meta-data, when a part or all of a moving-image that is an object of the plural pieces of meta-data is edited;
   a unit configured to record validity information indicating one of "valid", "invalid" and "partly valid" states as current validity of a piece of meta-data in the same storing form as that of the invalidity information, with regard to each of the plural pieces of meta-data; and
   a unit configured to attempt to recalculate the piece of meta-data in order to keep the piece of meta-data valid as much as possible, with regard to each of the plural pieces of meta-data, when a part or all of a moving-image that is an object of a piece of meta-data is edited, and to copy the invalidity information to a storage area for validity information of the piece of meta-data if the piece of meta-data cannot be recalculated.

2. The device according to claim 1, further comprising a unit configured to record information on overlapping and cutting-out of a part or all of an area of a moving-image that is an object of a piece of meta-data caused by a part or all of an area on which the editing operation is performed, when an editing operation is performed on a part or all of a moving-image that is an object of the piece of meta-data.

3. The device according to claim 1, further comprising a unit configured to record, when a part of a moving-image is cut out, information indicating if only a forward-part is cut out, only a back-part is cut out, or both a forward-part and a back-part are cut out, for a meta-data corresponding to the moving-image part of which is cut out.

4. The device according to claim 1, further comprising a unit configured to copy the invalidity information to a storage area for the validity information.

5. A moving image management method for recording and managing plural pieces of meta-data for a part or all of a moving-image for multiple moving-images recorded on a recording medium, comprising:

a step of, with regard to each of the plural pieces of meta-data, recording invalidity information indicating which one of "valid", "invalid" and "partly valid" states will exist when a part or all of a moving-image that is an object of the plural pieces of meta-data is edited; and a step of, with regard to each of the plural pieces of meta-data, recording validity information indicating one of "valid", "invalid" and "partly valid" states as current validity of a piece of meta-data in the same storing form as that of the invalidity information; and a step of, with regard to each of the plural pieces of meta-data, attempting to recalculate the piece of meta-data in order to keep the piece of meta-data valid as much as possible when a part of all of a moving-image that is an object of a piece of meta-data is edited, and to copy the validity information to a storage area for validity information of the piece of meta-data if the piece of meta-data cannot be recalculated, wherein the steps are performed using a moving image management hardware device.

* * * * *